June 23, 1931.  M. JOHNSON  1,811,584
CULTIVATOR SWEEP
Filed Oct. 10, 1930
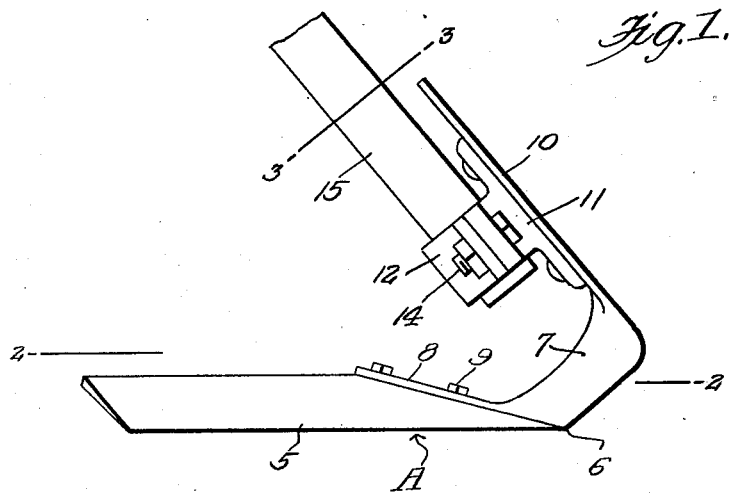
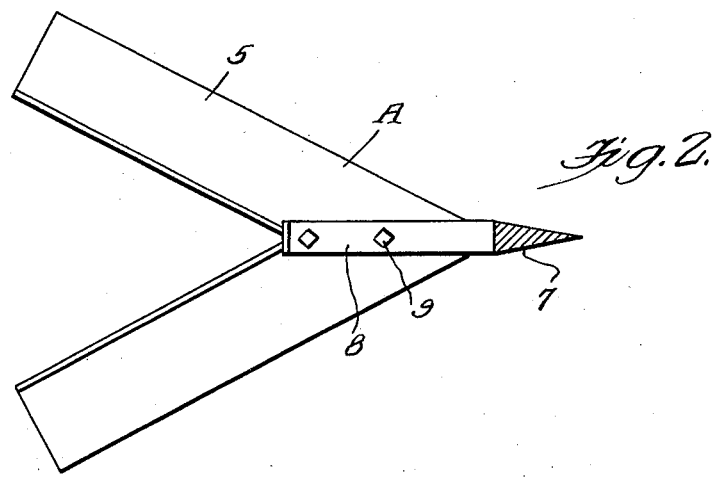
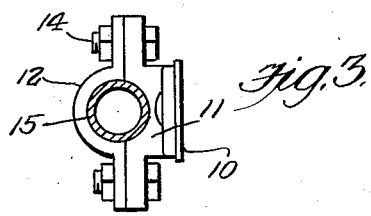
Inventor
Melvin Johnson,
By Clarence A. O'Brien
Attorney Patented June 23, 1931

1,811,584

UNITED STATES PATENT OFFICE

MELVIN JOHNSON, OF FOREST CITY, IOWA

CULTIVATOR SWEEP

Application filed October 10, 1930. Serial No. 487,851.

The present invention relates to a cultivator sweep and has for its prime object to provide a structure which results in lighter draft and performs cleaner work than the ordinary well known sweep in use on garden plows.

Another very important object of the invention resides in the provision of a cultivator sweep of this nature which is exceedingly simple in its construction, inexpensive to manufacture, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the cultivator sweep embodying the features of my invention, and Figures 2 and 3 are sectional views therethrough taken substantially on the lines 2—2 and 3—3 respectively of Figure 1.

Referring to the drawings in detail it will be seen that I provide a substantially V-shaped sweep A comprising a pair of inclined wings 5 which diverge rearwardly from each other from their front juncture the front end of which is in the form of a point 6. The wings 5 are of a cross sectional shape which provides comparatively sharp outer cutting edges.

A knife 7 inclines upwardly and forward from an apertured arm 8 which extends rearwardly and upwardly from the lower end of the knife and is bolted or otherwise secured as at 9 to the front or apex portion of the sweep A. This knife 7 is inclined upwardly and forwardly and is of an isosceles triangular cross sectional formation as is illustrated to advantage in Figure 2.

The upper end of the knife merges into an upwardly and rearwardly inclined shank plate 10 on which is fastened a clamp section 11 and a clamp section 12 is bolted as at 14 to the section 11 for engaging the lower end of a shank 15 between the sections. Adjacent its point of mergence with the plate 10, the cutting edge of the knife 7 is rounded.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, in the materials and in the combination and arrangement of parts may be resorted to without departing from the spirit or scope of the invention as hereinafter claimed or sacrificing any of its advantages.

Having thus described my invention, what I claim as new is:

A device of the class described comprising a substantially V-shaped sweep including rearwardly diverging wings having their outer edges disposed below the horizontal plane of their inner edges, the outer edges formed to provide knife edges, a knife extending upwardly and forwardly from the apex portion of the sweep, said knife being of a substantially isosceles triangular cross sectional shape, an integral apertured arm extending upwardly and rearwardly from the lower end portion of the knife and rigidly secured to the sweep, a shank plate merging upwardly and rearwardly from the upper end of the knife, and a clamp mounted on the shank plate for engagement with a support, the cutting edge of the knife being rounded adjacent its point of mergence with the plate.

In testimony whereof I affix my signature.

MELVIN JOHNSON.